April 15, 1952

L. BIRKIGT 2,592,853

MULTIPLE SPINDLE SPINNING MACHINE OF
THE WORM AND WORM WHEEL DRIVE TYPE

Filed March 13, 1951

INVENTOR
LOUIS BIRKIGT,
BY
Robert B Pearson
ATTORNEY

April 15, 1952    L. BIRKIGT    2,592,853
MULTIPLE SPINDLE SPINNING MACHINE OF
THE WORM AND WORM WHEEL DRIVE TYPE
Filed March 13, 1951    2 SHEETS—SHEET 2

INVENTOR
LOUIS BIRKIGT,
BY
ATTORNEY

UNITED STATES PATENT OFFICE 2,592,853

MULTIPLE SPINDLE SPINNING MACHINE OF THE WORM AND WORM WHEEL DRIVE TYPE

Louis Birkigt, Versoix-Geneva, Switzerland, assignor to Society "Hispano-Suiza" (Suisse) S. A., Geneva, Switzerland, a society of Switzerland Application March 13, 1951, Serial No. 215,247
In Luxemburg March 30, 1950

3 Claims. (Cl. 57—102)

The present invention relates to multiple spindle spinning machines having their spindles driven through a multiplicity of worm and worm wheel transmissions from a driving shaft which carries the worm wheels, this shaft being constituted by a plurality of sections coupled together by coupling devices, each of these coupling devices being constituted by a tenon piece or the like inserted between the ends of two shaft sections to be connected together, and the coupling zone being covered by two slidable sleeves adapted to be secured on said shaft sections, for instance by means of screws.

The object of my invention is to provide a machine of this type which is better adapted to meet the requirements of practice than those used up to now.

For this purpose, according to my invention, each of the above mentioned sleeves carries the worm wheel, belonging to the above mentioned multiplicity of worm wheels, which is located between the coupling device and the bearing nearest to said sleeve.

A preferred embodiment of my invention will be hereinafter described with reference to the accompanying drawing, given merely by way of example and in which.

Figure 1:
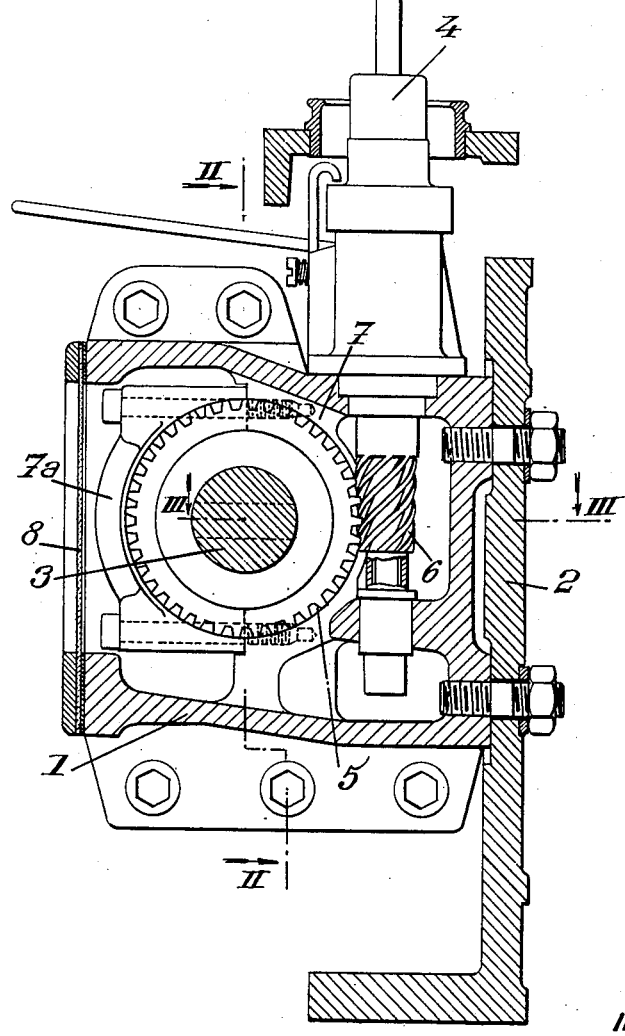
Fig. 1 is a cross section, on the line I—I of Fig. 2, of a multiple spindle spinning machine according to my invention.
Figure 2:
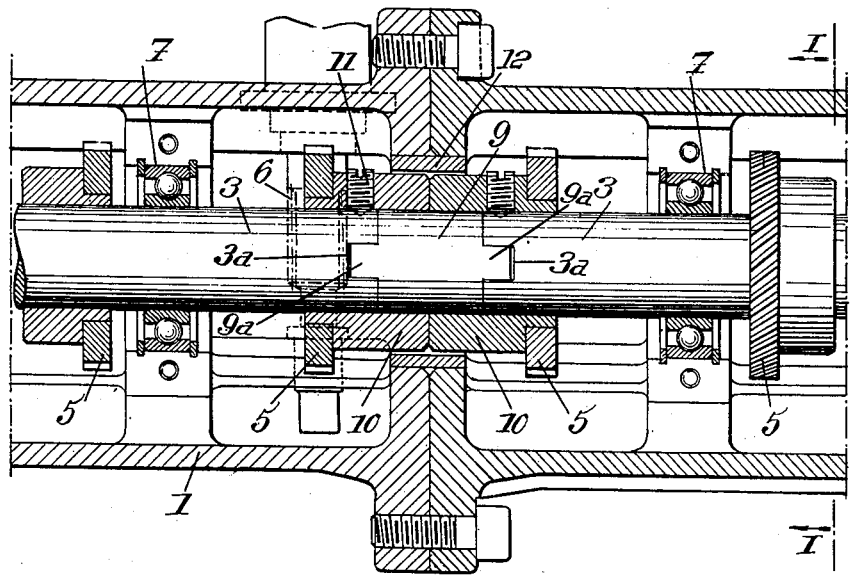
Fig. 2 is a longitudinal vertical section of this machine on the line II—II of Fig. 1.
Figure 3:
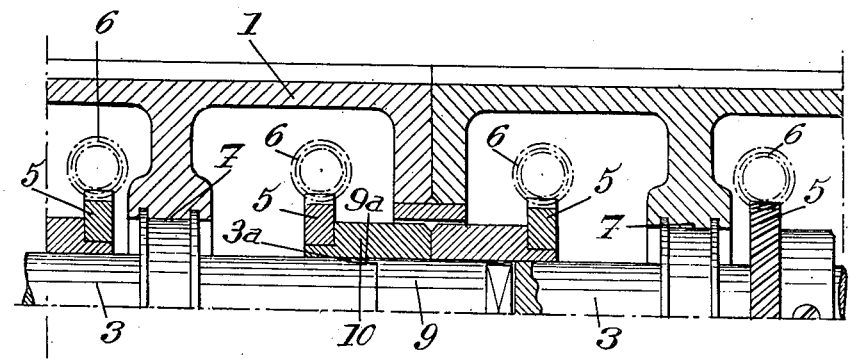
Fig. 3 is a horizontal section, with parts cut away, on the line III—III of Fig. 1.

My invention relates to the construction of spinning machines including a multiplicity of spindles (for instance about one hundred and fifty) driven through worm and worm wheel devices.

This machine includes, in the usual fashion, a casing 1, advantageously constituted by several elements disposed end to end, each element being for instance 1 metre long for a machine the total length of which is about 15 metres.

Preferably, this casing is secured on a support 2 which constitutes the base of the machine.

In order to drive the spindles 4 of this machine, I provide a driving shaft 3 carrying as many worm wheels 5 as there are spindles, each of these worm wheels meshing with a worm 6 carried by the corresponding spindle.

As this driving shaft 3 is of a total length nearly equal to that of the machine, it is made of several sections (advantageously as many sections as there are casing elements) assembled together by suitable coupling means.

Every section of driving shaft 3 is supported by at least two bearings 7, for instance ball bearings, located at a sufficient distance from the coupling means provided at the ends of said section for making it possible to dispose at least one spindle and its worm wheel between every coupling means and the nearest bearing.

Furthermore, the length occupied by bearings 7 and the coupling means, and also the spacing between these elements, are preferably determined in such manner that all the worm wheels 5 (and consequently all the spindles 4) can be spaced at regular intervals over the whole length of driving shaft 3, the value of this interval being advantageously equal to the standard interval usually employed in spinning machines the spindles of which are driven by means of belts (distance between axes equal to 63.5 millimeters).

Concerning the coupling means through which the shaft sections are assembled, they are designed in such manner that every section of shaft 3 can be released and withdrawn through a window 8 provided for this purpose in each of the elements of casing 1.

For instance, as shown by the drawing, each bearing 7 includes a portion 7a which is removable through this window 8.

As for the coupling means, they include a piece 9 provided with tenons 9a and inserted between the ends of two adjacent shaft sections, these ends being provided with slots 3a for accommodating said tenons. The whole of the coupling thus constituted is surrounded by two slidable sleeves 10 adapted to be fixed thereon through suitable means, for instance screws 11.

According to my invention, every sleeve 10 supports the worm wheel 5 located between said coupling means and the bearing 7 nearest to said sleeve.

When compared with the arrangement which would consist in placing these worm wheels on either side of said sleeve 10, my arrangement has the advantage of reducing the free space which must be provided on either side of the coupling device to make it possible to disengage the sleeves when the coupling device is to be cleared in order to remove a shaft section.

Furthermore, with my arrangement, the middle portion of the coupling device can be used as a journal cooperating with a plain bearing 12, which would not be possible if the worm wheel were mounted on the middle part of a sleeve made of a single piece.

In order to remove a shaft section, I proceed as follows:

After opening the window 8 located opposite this shaft section, I remove the portion 7a of the two bearings 7 which support said shaft section. Then the two sleeves 10 located at the respective ends of the shaft section are loosened, by unscrewing screws 11, and slipped toward the middle part of the shaft section. Said shaft section can then easily be removed by causing its slotted ends to slide along the tenons of the respective coupling devices which cooperate with said ends.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A multiple spindle spinning machine which comprises, in combination, a plurality of spinning spindles mounted on this support, a worm carried by each of said spindles, a support, a shaft extending in said support, a plurality of worm wheels carried by said shaft in mesh with said worms, a plurality of bearings for said shaft carried by said support, said shaft being made of a plurality of sections disposed end to end, a device for coupling the end of each shaft section with the adjacent end of the next shaft section, this coupling device including a coupling member in line with said shaft sections, two tenon and mortise cooperating means for assembling the adjoining ends of said member and each of said shaft sections, two sleeves slidable along said shaft sections each arranged to cover one of said tenon and mortise means, and means for detachably securing said sleeves on said shaft sections respectively, and a worm wheel carried by each of said sleeves, each of said last mentioned worm wheels being one of the above mentioned plurality of worm wheels.

2. A machine according to claim 1 in which the two sleeves of every coupling constitute a journal for said shaft, and a plain bearing carried by said support for supporting each of said journals respectively.

3. A multiple spindle spinning machine which comprises, in combination, a support, a plurality of spinning spindles mounted on this support, a worm carried by each of said spindles, a shaft extending in said support, a plurality of worm wheels carried by said shaft in mesh with said worms, a plurality of bearings for said shaft carried by said support, said shaft being made of a plurality of sections disposed end to end, a device for coupling the end of each shaft section with the adjacent end of the next shaft section, this coupling device including a coupling member in line with said shaft sections, two tenon and mortise cooperating means for assembling the adjoining ends of said member and each of said shaft sections, two sleeves slidable along said shaft sections each arranged to cover one of said tenon and mortise means, and means for detachably securing said sleeves in adjoining relation to each other on said shaft sections respectively, and a worm wheel carried by each of said sleeves, each of said last mentioned worm wheels being one of the above mentioned plurality of worm wheels.

LOUIS BIRKIGT.

No references cited.